United States Patent
Alhazmy

(10) Patent No.: US 9,790,103 B2
(45) Date of Patent: Oct. 17, 2017

(54) HYDROGEN-POWERED DESALINATION PLANT

(71) Applicant: KING ABDULAZIZ UNIVERSITY, Jeddah (SA)

(72) Inventor: Majed M. Alhazmy, Jeddah (SA)

(73) Assignee: KING ABDULAZIZ UNIVERSITY, Jeddah (SA)

( * ) Notice: Subject to any disclaimer, the term of this patent is extended or adjusted under 35 U.S.C. 154(b) by 505 days.

(21) Appl. No.: 14/285,450

(22) Filed: May 22, 2014

(65) Prior Publication Data

US 2015/0336807 A1 Nov. 26, 2015

(51) Int. Cl.
| | | |
|---|---|---|
| *C02F 1/06* | (2006.01) | |
| *C02F 103/08* | (2006.01) | |
| *B01D 1/16* | (2006.01) | |
| *B01D 3/06* | (2006.01) | |
| *C02F 1/14* | (2006.01) | |

(52) U.S. Cl.
CPC ............ *C02F 1/06* (2013.01); *B01D 1/16* (2013.01); *B01D 3/065* (2013.01); *C02F 1/14* (2013.01); *C02F 2103/08* (2013.01)

(58) Field of Classification Search
CPC .......... C02F 1/06; C02F 2103/08; C02F 1/04; C02F 1/02; C02F 1/048; B01D 1/16; B01D 1/26; B01D 3/065; B01D 5/006
See application file for complete search history.

(56) References Cited

U.S. PATENT DOCUMENTS

| | | | | |
|---|---|---|---|---|
| 3,933,600 A | * | 1/1976 | Dodge | B01D 1/14 126/360.2 |
| 4,077,469 A | * | 3/1978 | Hamrick | E21B 34/16 166/59 |
| 4,463,803 A | * | 8/1984 | Wyatt | F22B 1/26 122/31.1 |
| 6,279,321 B1 | | 8/2001 | Forney | |
| 7,785,744 B2 | | 8/2010 | Sridhar et al. | |
| 2005/0034446 A1 | | 2/2005 | Fielder | |
| 2005/0189234 A1 | * | 9/2005 | Gibson | C25B 1/04 205/337 |

(Continued)

OTHER PUBLICATIONS

El-Dessouky, Hisham T., and Hisham Mohamed. Ettouney. Fundamentals of Salt Water Desalination. Amsterdam: Elsevier, 2002. Print.*

*Primary Examiner* — Brian McCaig
*Assistant Examiner* — Briana Obenhuber
(74) *Attorney, Agent, or Firm* — Richard C. Litman

(57) ABSTRACT

The hydrogen-powered desalination plant is a multi-stage flash desalination system using hydrogen fuel to power the top brine heater of the plant. The hydrogen-powered desalination plant includes a plurality of flash distillation stages, which each include a flash chamber and a condenser. The top brine heater in the hydrogen-powered desalination plant is powered by the carbon-free combustion of hydrogen gas with oxygen gas. The combustion of the hydrogen gas with the oxygen gas creates a flame, which is used directly to generate steam from atomized seawater, any seawater not converted to steam being collected as preheated brine and passed to the multi-stage flash desalination system for successive stages of flash distillation. Preferably, the flame is generated as a vortex.

3 Claims, 3 Drawing Sheets

(56) References Cited

U.S. PATENT DOCUMENTS

| | | | |
|---|---|---|---|
| 2007/0072027 A1* | 3/2007 | Sridhar | B01D 1/26 210/174 |
| 2010/0154429 A1* | 6/2010 | Peters | B01D 1/0058 60/772 |
| 2010/0272630 A1 | 10/2010 | Rosenbaum | |
| 2011/0162952 A1* | 7/2011 | Conchieri | B01D 1/16 203/11 |
| 2011/0232545 A1* | 9/2011 | Clements | F22B 1/1853 110/234 |
| 2012/0325290 A1 | 12/2012 | Gizara | |

* cited by examiner

US 9,790,103 B2

HYDROGEN-POWERED DESALINATION PLANT

BACKGROUND OF THE INVENTION

1. Field of the Invention

The present invention relates to desalination plants for producing potable water, and particularly to a hydrogen-powered desalination plant that provides a multi-stage flash (MSF) desalination plant powered by carbon-free combustion of hydrogen.

2. Description of the Related Art

Desalination is a growing industry in many parts of the world. Both countries with vast areas of arid land and countries having more diverse climates are increasingly producing fresh water through desalination to meet the demands of growing populations and rising standards of living.

Several desalinating methods for seawater or brine have been developed, and may mainly be classified into two types. The first type is membrane isolation, such as reverse osmosis filtering or electrodialysis. The reverse osmosis method is suitable for desalinating seawater, and the electric dialysis is suitable for treating brine containing lesser quantities of salt. The second type is thermal separation. Thermal separation usually involves two cycles of evaporation followed by condensation. Reverse osmosis usually requires elevation of seawater pressure before introducing the seawater to the membrane separation system, while thermal separation typically requires elevating seawater temperature to start the thermal separation process.

Multi-stage flashing (MSF) and multistage effect evaporation (MEE) are the most developed thermal desalination technologies, Both processes require steam to heat up the seawater and elevate its temperature to start evaporation. For this reason, thermal desalination plants are usually coupled with separate power plants or steam generation plants, where low pressure steam is used to preheat seawater in the top brine heater before starting the desalination process. The heating steam is the exhaust of a conventional power turbine (or a back pressure turbine) in a simple steam power plant (Rankine cycle). The heating steam circulates in a closed loop between the power plant (steam generator) and the top brine heater of the desalination plant and works as an intermediate fluid to provide the needed heat to drive the top brine heater. The generation of heating steam undergoes a separate sequence of heating, expanding, condensing and pumping in the power plant. The top brine heater may be considered as a steam condenser for the power plant. The heating process takes place at a relatively low temperature (90° C.~120° C.) to avoid salt precipitations and scale formation on the walls of the pipes carrying the heating steam. While such conventional power plants or steam generation plants are practical for providing the heat or steam needed to preheat the seawater, they are indirect processes, thus having low efficiency. Heating the brine using direct flame is more efficient. However, a direct flame produced by the combustion of hydrocarbon fuel cannot be used because it contains many non-condensable gases ($CO_2$), toxic gases ($NO_x$ and $CO$), and unburned hydrocarbons, among other combustion products. Moreover, the combustion by-products and exhaust gases discharged from the power plants using hydrocarbon fuels are not environmentally friendly, and contribute to the greenhouse effect.

Thus, a hydrogen-powered desalination plant solving the aforementioned problems is desired.

SUMMARY OF THE INVENTION

The hydrogen-powered desalination plant is a multi-stage flash desalination system using hydrogen fuel to power the brine heater of the plant. The hydrogen-powered desalination plant includes a plurality of flash distillation stages, which each have a flash chamber and a condenser. The condenser (also known as a "feed heater") has at least one conduit passing through the plurality of flash chambers. Intake seawater is introduced into the interiors of the condenser tubes of the last flash stage. The feed is heated by regeneration in the condenser (i.e., the feed water heater) as it travels up to the top stage. The brine temperature is increased further as it is heated in the top brine heater by direct flame produced by the combustion of hydrogen gas and oxygen gas. The flashing brine flows counter to the feed flow from the first to the last flashing stage.

The top brine heater includes a sprinkler having nozzles for atomizing at least a portion of the seawater, and combustion of the hydrogen gas and the oxygen gas results in a flame for evaporating atomized seawater to generate steam and to heat the remaining part of the fed seawater (i.e., the brine). Preferably, the flame is generated as a vortex. The very high temperature brine is injected into the plurality of flash chambers and is flashed into steam therein. The steam condenses on an external surface of the at least one conduit to form the condensed, desalinated water, which is then removed and used as a source of potable water.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
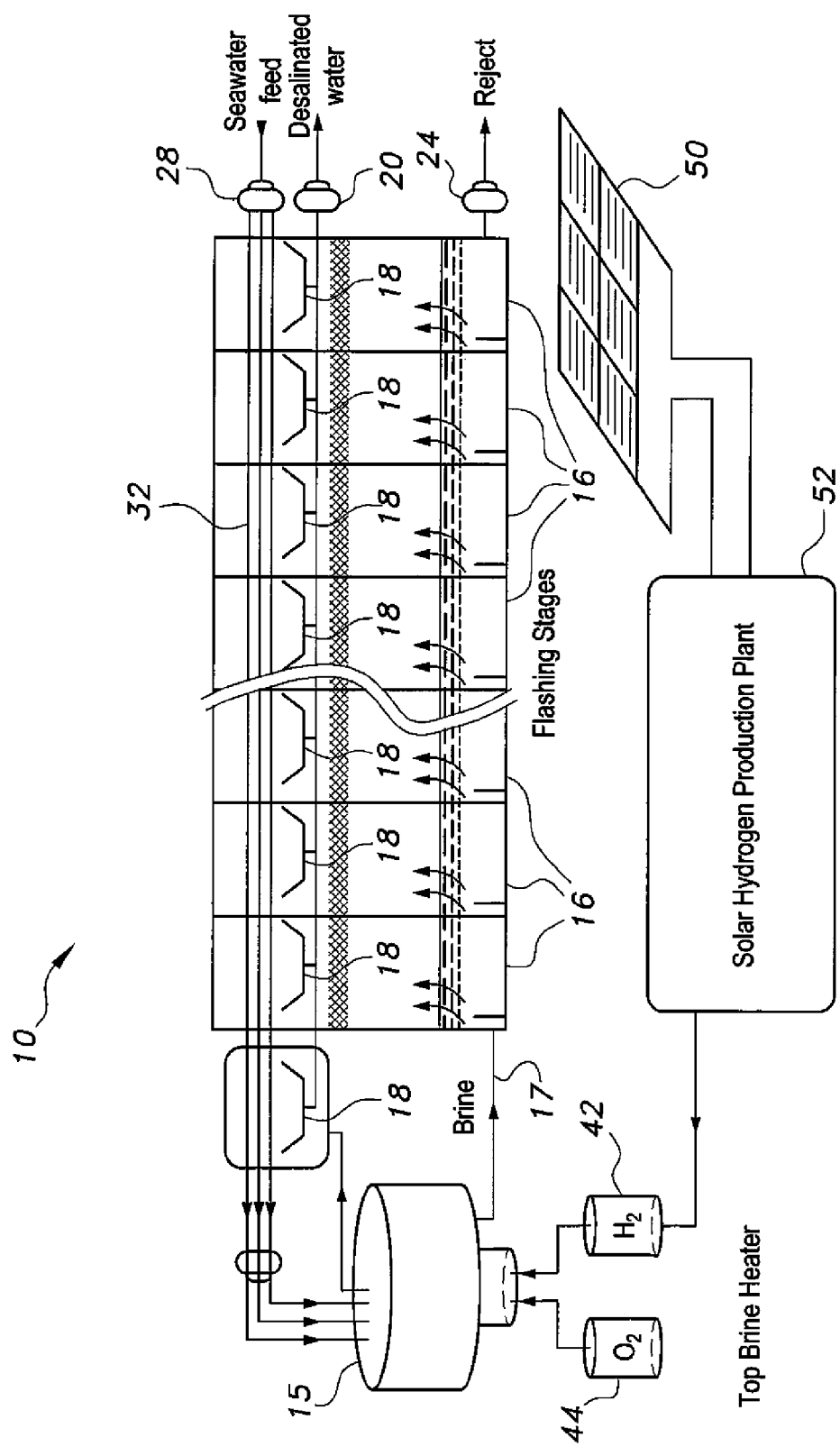
FIG. 1 is a schematic diagram of a multi-stage flash (MSF) desalination plant coupled to a hydrogen-powered top brine heater to form a hydrogen-powered desalination plant according to the present invention.
Figure 2:
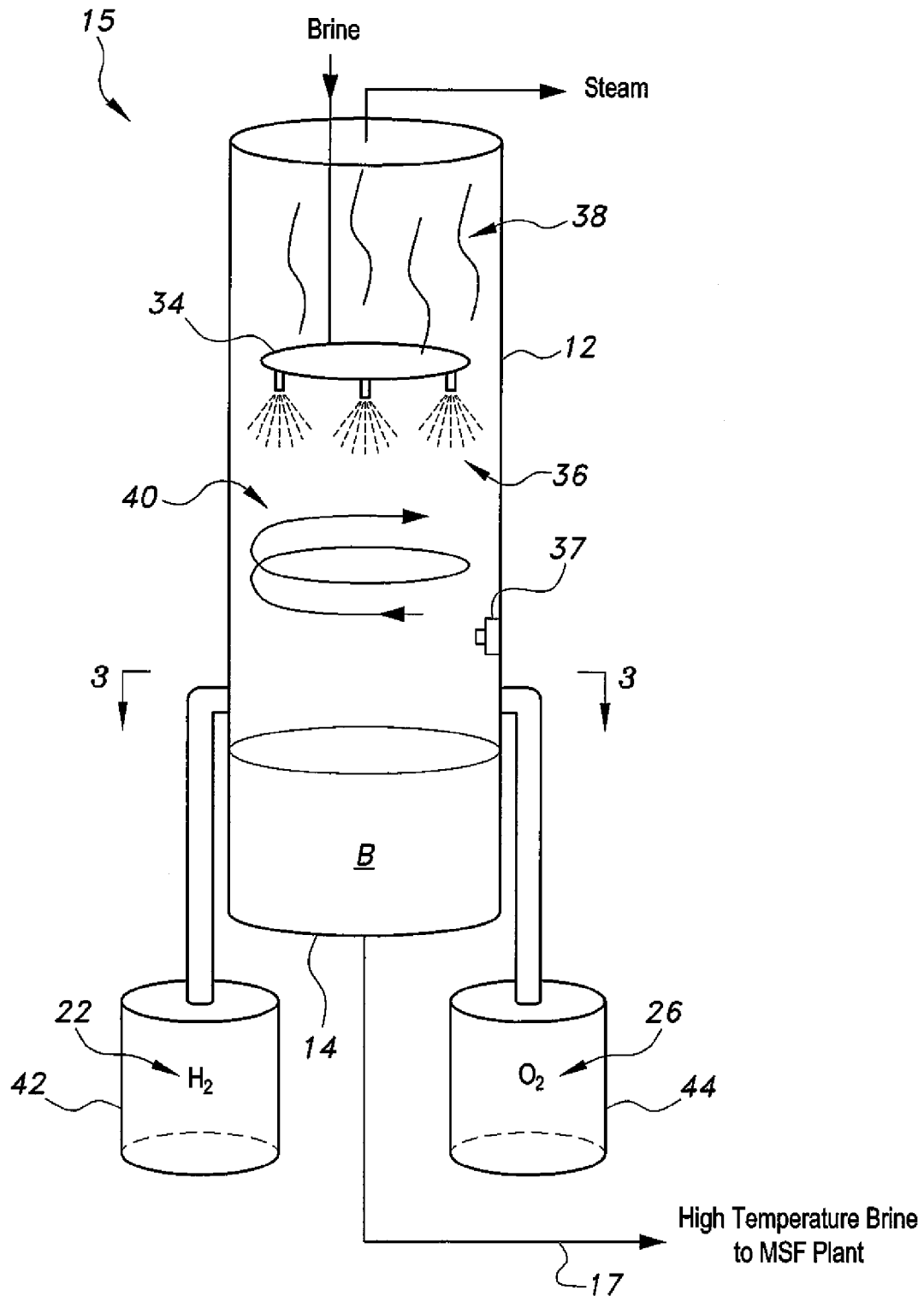
FIG. 2 is a schematic diagram of the hydrogen-powered top brine heater used in the hydrogen-powered desalination plant of FIG. 1.

The hydrogen-powered desalination plant, designated generally as 10 in the drawings, couples a multi-stage flash desalination plant with a hydrogen-powered top brine heater that is used to elevate the temperature of the brine to the temperature suitable for flashing in the first stage in the MSF plant without consuming hydrocarbon fuel. As shown in FIG. 1, in use, feed seawater enters the system under pressure, being drawn into the plant 10 via a pump 28 or the like. The seawater is transported directly, under pressure, through conduits or pipes 32 from the feed heater of the bottom stage up to the top brine heater 15, which then delivers heated brine to flash chambers 16. The top brine heater 15, which is shown in FIG. 2, incorporates a brine heater 14, normally a component in conventional MSF plants. Conventional MSF systems are well-known. U.S.

Pat. Nos. 3,966,562 and 3,948,734, both of which are hereby incorporated by reference in their entirety, show conventional MSF systems.

The seawater feed is pumped by a conventional pump 28 or the like to feed heater conduits 32. The feed is heated by condenser-type heat exchangers (i.e., feed heaters) where the feed is heated by the heat released from condensing the vapor flashed off in each stage. Feed reaches the top stage at an elevated temperature. However, it is not high enough to start flashing, and therefore additional heat must be supplied. The brine heater 14 receives hydrogen and oxygen gases from storage tanks 42, 44, respectively. A flame produced from the combustion of the hydrogen and oxygen is directly used to elevate the temperature of the brine in the top brine heater 15 to a level suitable to start flashing. The brine is then injected into the flash chambers 16 through conduits or pipes 17. It should be understood that the number of flash chambers 16 shown in FIG. 1 is shown for exemplary purposes only, and is a simplification of the number of flash stages. Typical MSF plants have between fifteen and forty stages or chambers. The brine delivered by the brine heater 14 typically has a temperature of between approximately 90° C. and 120° C., depending upon the chemical treatment or scale prevention technique used, the quality and volume of heating flame produced by the hydrogen-oxygen combustion, and the ejection system maintaining pressure in each stage.

The operating pressure in the flash chambers 16 is lower than that in the heater, thus causing the heated brine to rapidly boil or "flash" into vapor. Typically, only a small percentage of this water is converted into vapor. Consequently, the remaining water will be sent through a series of additional stages or flash chambers 16, as shown, each possessing a lower operating pressure than the previous chamber. The brine is delivered through each successive flash chamber 16 or stage through any conventional method. As vapor is generated, it is condensed on the outer surfaces of the feed heaters, represented by pipes 32, which run through each chamber 16. The condensed water is then collected by collection trays 18 and is removed by a pump 20 to produce a stream of potable water. As in a conventional MSF plant, the pipes 32 and trays 18 form the condensers for each flash stage. The remaining brine with a high saline concentration may be drawn out by a separate pump 24 and removed as rejected waste.

As opposed to a conventional MSF plant, which typically uses a simple steam power plant, such as a Rankine cycle power plant, the hydrogen-powered desalination plant 10 uses direct flame produced by combustion of hydrogen fuel 22 with oxygen 26 to provide heat for the top brine heater 15. As best shown in FIG. 2, the top brine heater 15 includes a thermally insulated chamber containing a sprinkler 34. It should be understood that the sprinkler 34 may be any suitable type of sprinkler or atomizer for producing droplets of seawater. Although three sprinkler nozzles are shown in FIG. 2, it should be understood that the nozzles are shown for exemplary purposes only, and that any suitable type or number of sprinkler nozzles may be used.

Figure 3:
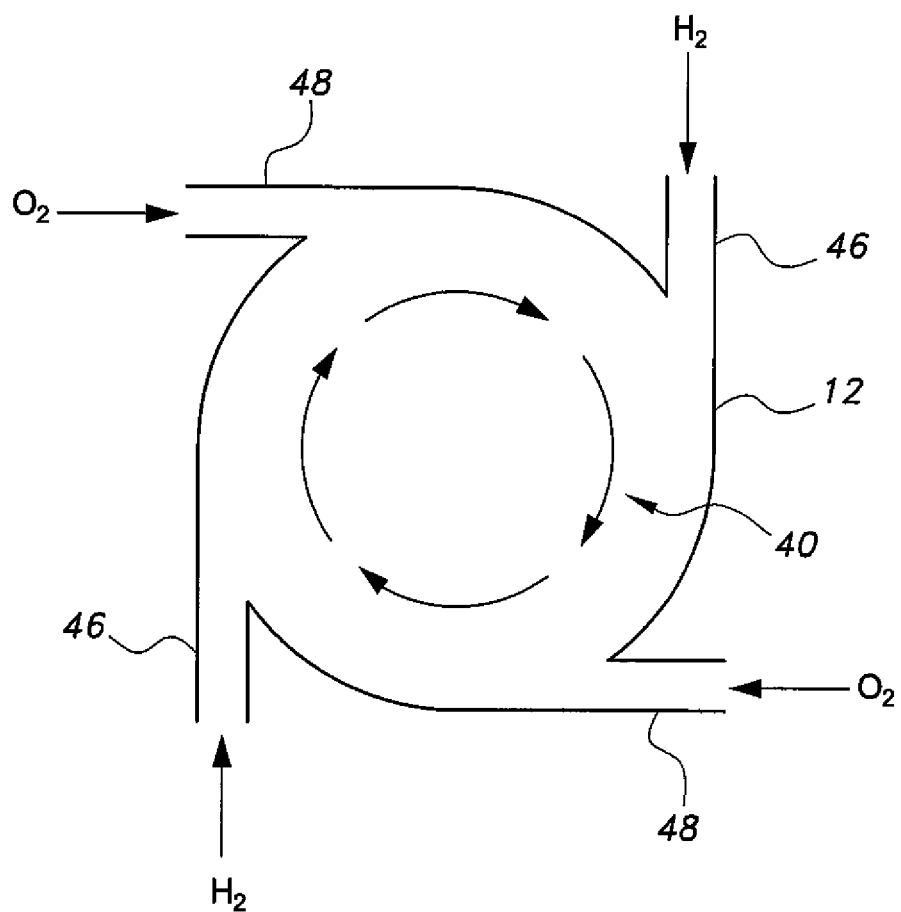
FIG. 3 is a schematic section view taken along lines 3-3 of FIG. 2.

The sprinkler 34 produces droplets 36 of the seawater, as shown. Steam 38 is produced by boiling of droplets 36 by a flame 40 induced by an igniter 37, e.g., a spark plug or spark gap ignition device. Pressurized hydrogen gas 22 is contained within container 42 and pressurized oxygen gas 26 is contained within container 44. The hydrogen gas 22 and oxygen gas 26 are introduced into the lower portion of the chamber beneath the sprinkler 34 under control by any suitable valves or the like. The hydrogen gas 22 combusts with oxygen gas 26 to generate flame 40. As shown in FIG. 3, the flame 40 is preferably helical. This effect is generated by feeding hydrogen gas 22 tangentially into the cylindrical chamber defined by the housing 12 through a pair of inlet ports 46 that are radially opposed from one another and directing the oxygen gas 26 into chamber through a pair of inlet ports 48 that are also radially opposed from one another, so that the hydrogen inlet streams move in a tangential direction orthogonal to the tangential direction of the oxygen inlet streams, creating a vortex within the chamber.

The flame 40 generates heat and water vapor, but no carbon dioxide, as opposed to the combustion of hydrocarbon fuels. Thus, the generation of steam 38 is environmentally friendly. The steam is fed back to the MSF plant, as in a conventional MSF plant, and the heat generated by the combustion is used to heat brine B, which is received in the brine heater 14, contained in the lower end of the generator housing 12. The brine B is heated by direct flame produced by the combustion to an elevated temperature (typically on the order of about 100° C.) and passed for flashing through conduits or pipes 17. Brine then expands in a throttling nozzle to the top flashing stage of the MSF plant, as in a conventional MSF plant. It should be understood that only a portion of the brine is converted to steam. The remaining portion of the brine forms the heated volume of brine B, which is passed to the top flashing stage of the MSF plant.

As shown in FIG. 1, in order to make the plant 10 more environmentally friendly, the hydrogen gas may be manufactured by a solar hydrogen production plant 52, powered by solar panels 50 or the like. It should be understood that any suitable type of hydrogen production may be used, for example, by hydrolysis of water powered by electricity generated by solar panels 50 or the like.

It is to be understood that the present invention is not limited to the embodiments described above, but encompasses any and all embodiments within the scope of the following claims.

I claim:

1. A desalination plant for producing fresh water from a supply of seawater, the desalination plant comprising:
   a plurality of flash distillation stages;
   each one of the plurality of flash distillation stages includes:
   a flash chamber for flashing brine; and
   a feed heater and condenser, the feed heater and condenser having at least one conduit having an inlet and an outlet, and
   a collector and pipe system for collecting fresh water from the feed heater and condenser, and piping the fresh water out of the flash distillation stage;
   wherein the at least one conduit successively passes through each one of the plurality of flash chambers; the desalination plant further comprising:
   a first pump connected to the at least one conduit for feeding brine under pressure through each one of the feed heater and condensers;
   a second pump connected to the collector and pipe system for removing the fresh water from the plurality of flash distillation stages;
   a top brine heater having:
   a housing having a cylindrical combustion chamber and a pool disposed below the combustion chamber to collect preheated brine;

an inlet connected to the outlet of the feed heater and condenser of a first one of the flash distillation stages, the inlet extending into the combustion chamber;

a plurality of sprinkler nozzles disposed in the combustion chamber at the top brine heater inlet for atomizing the brine entering the combustion chamber;

a source of hydrogen gas;

a source of oxygen gas; and a metered conduit system extending between each of the sources of hydrogen and oxygen gases and the combustion chamber for introducing metered amounts of hydrogen and oxygen into the combustion chamber, wherein the metered conduit system includes a pair of hydrogen and oxygen entrance ports, each of the hydrogen and oxygen entrance ports enter the cylindrical combustion chamber tangentially from orthogonal directions thereby being radially opposed from one another and alternate with each other circumferentially about the cylindrical chamber, creating a helical vortex within the cylindrical chamber;

an igniter selectively introducing a flame into the combustion chamber to ignite the hydrogen and oxygen gases to convert the atomized brine into steam and preheated brine, the preheated brine collecting in the top brine heater, wherein the flame defines a helical vortex and is in direct contact with the atomized brine;

a steam conduit extending from the top brine heater through the flash chambers for heating seawater flowing through each one of the feed heater and condenser in the flash chambers;

a brine conduit extending from the top brine heater through the flash chambers for conveying the preheated brine through successive flash chambers for successive stages of evaporation and condensation, thereby producing desalinated water;

a desalination exit port extending from the second pump for removing the fresh water from all of the flash chambers; and a brine exit port extending from the flash chambers for removing concentrated brine from the flash chambers.

2. The desalination plant for producing fresh water from a supply of seawater as recited in claim 1, wherein the combustion chamber of the top brine heater defines a thermally insulated chamber.

3. The desalination plant for producing fresh water from a supply of seawater as recited in claim 1, further comprising:

at least one collection tray positioned within each of the flash chambers; and a pump for transferring the condensed water from the at least one collection tray to the desalination exit port.

\* \* \* \* \*